April 2, 1935. E. PYZEL ET AL 1,996,257
PROCESS AND APPARATUS FOR THE SEPARATION OF LIQUIDS FROM GASES
Filed Feb. 4, 1933
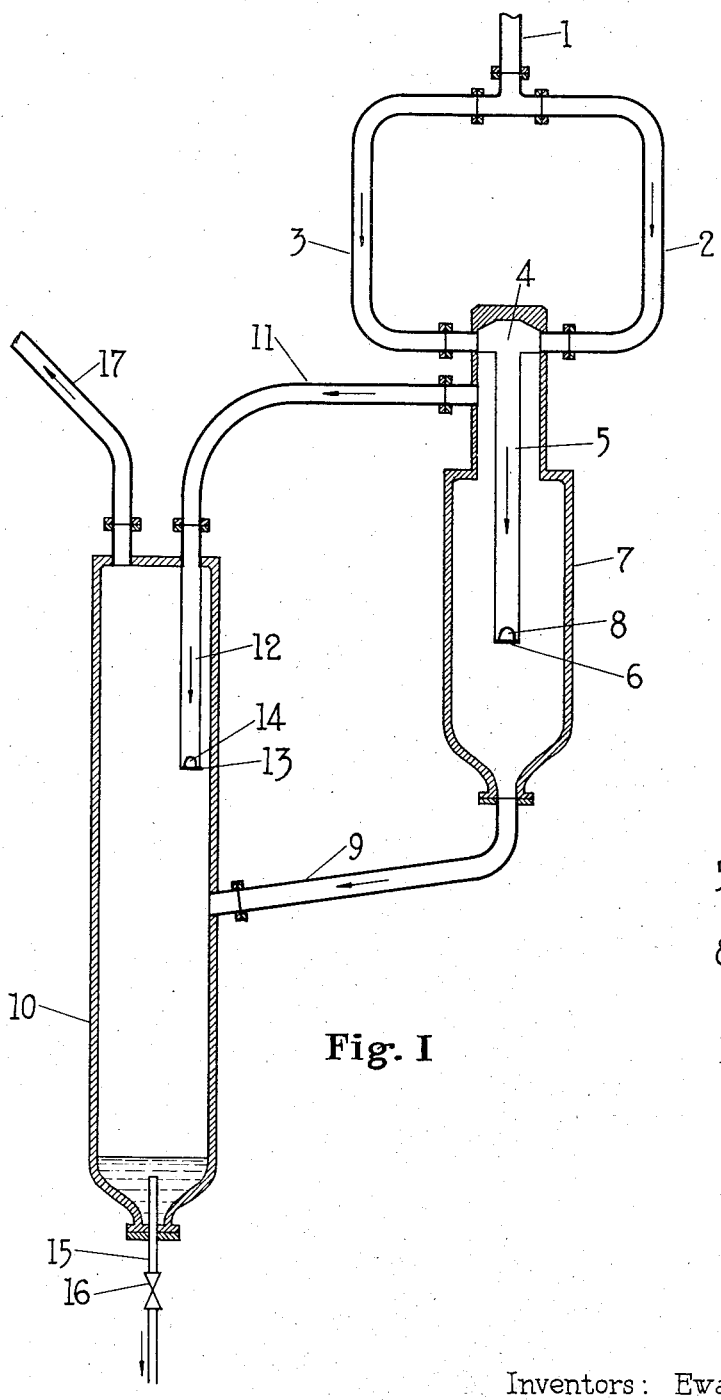
Fig. I
Fig. II
Inventors: Ewald Pyzel
& Richard Tillmann
By their Attorney Patented Apr. 2, 1935

1,996,257

UNITED STATES PATENT OFFICE 1,996,257

PROCESS AND APPARATUS FOR THE SEPARATION OF LIQUIDS FROM GASES

Ewald Pyzel, Pittsburg, Calif., and Richard Tillmann, The Hague, Netherlands, assignors to Shell Development Company, San Francisco, Calif., a corporation of Delaware Application February 4, 1933, Serial No. 655,232

5 Claims. (Cl. 183—122)

This invention relates to the mechanical separation of liquid from a stream of gases, and is more particularly concerned with the removal of liquid ammonia from a stream of mixed hydrogen and nitrogen gas.

It is a purpose of this invention to devise a means for effecting a more complete separation of the entrained liquid from the gas stream.

In the manufacture of ammonia, from nitrogen and hydrogen gas mixtures, by a synthesis process, it is the usual practice to remove the ammonia formed in the converters by either liquefying the ammonia or by absorbing the same in water. Both methods of ammonia removal are in common use. Of the two, the liquefaction method has several advantages such as enabling liquid anhydrous ammonia to be produced in the system and ensuring that the nitrogen-hydrogen gas returned to the converter is free from moisture.

In liquefaction ammonia removal processes, the removal of condensed ammonia from the high pressure gas stream is difficult as the condensate is partly in the form of a fine mist which is troublesome to precipitate or agglomerate.

In carrying out ammonia synthesis it is of the utmost importance that the removal of ammonia is as near complete as possible, because under the prevailing pressure and temperature in the presence of a specific catalyst, the percentage of ammonia is substantially the same, whether the gas entering the catalyst chamber, contains 2% ammonia or 2/10% ammonia. If, therefore, a conversion of 10% is possible in a given ammonia synthesis system and the ammonia is only removed down to 2% a loss in production of approximately 20% occurs as compared with when the ammonia is removed down to 2/10%.

Now we have found that by the use of our process and apparatus it is possible to effect an efficient separation of the liquid ammonia from the gas stream. The details of our invention will be better and more fully understood from the following description throughout which reference is made to the accompanying drawing.

Fig. I is a vertical sectional view of apparatus suitable for carrying out the invention.

Fig. II is a side view of discharge pipe showing detail construction.

Referring to Fig. I, mixed nitrogen and hydrogen gas containing ammonia is conducted from suitable low temperature apparatus (not shown) by means of pipe (1).

The gas stream is split into substantially equal parts and led through pipes (2) and (3).

The two gas streams discharge diametrically opposite each other into a chamber (4). The gas streams travelling at high velocity lose a great deal of their momentum when they come into contact with each other. As a result of this collision some of the entrained ammonia mist forms larger particles of liquid ammonia.

The gas stream formed is carried downward through pipe (5). At the lower end of this pipe there is mounted, at a slight angle with the horizontal, a plate (6). The gas and liquid flowing downward through pipe (5) impinges against plate (6) and is sprayed into the separator vessel (7) through opening (8).

Fig. II is a side view of pipe (5) showing the arrangement of plate (6) in relation to pipe (5).

The impact of the stream against plate (6) together with the rapid change of direction causes further joining together of the liquid ammonia particles.

The discharge opening (8) of pipe (5) is so arranged that the stream issuing from the opening by contact with the curved inside wall of vessel (7) is given a swirling motion. This may be accomplished by so placing the plate (6) on the end of pipe (5) that the gaseous stream emerging through the opening (8) is directed against the curved wall of chamber (7) at an angle to the horizontal.

In the vessel (7) a partial separation of the liquid ammonia from the nitrogen hydrogen gas takes place.

Liquid ammonia, together with some nitrogen and hydrogen gravitates to the bottom of the vessel and passes through pipe (9) into the second separator vessel (10).

Most of the nitrogen and hydrogen, together with some entrained ammonia is carried off from vessel (7) by means of pipe (11) and is discharged into vessel (10) through a pipe (12), having a similar construction to discharge pipe (5) mentioned above. By impact with the plate (13) at bottom of pipe (12) entrained ammonia particles in the stream coming from the top of vessel (7) tend to join together.

The discharge opening (14) is arranged so as to give a rotary motion to the gases in vessel (10). Ammonia droplets when they have reached the necessary size fall to the bottom of vessel (10).

The liquid in the stream discharging into vessel (10) by way of pipe (9) also collects in the bottom section. Liquid ammonia is continuously withdrawn through pipe (15) controlled by a valve (16). The pipe (15) protrudes a short distance into vessel (10) so as to reduce the possibility of the pipe becoming clogged by any solid matter which may accumulate in the bottom. The nitrogen and hydrogen gases pass off from the top of vessel (10) by pipe (17) and may be returned to the ammonia converter to be again passed over the catalyst.

As an example of the results obtained, we have for instance reduced the ammonia content of the stream entering our apparatus from 9.7% to 1.4% working with a pressure of 170 atmospheres and a minimum temperature in the system of −25° C.

It should be understood that while we have described our process and apparatus in connection with the removal of ammonia from a nitrogen-hydrogen gas stream we do not intend to limit ourselves to such a process. We may readily make use of our invention for the removal of other entrained liquids from gas streams for example in the synthesis of methanol from carbon monoxide and hydrogen we may separate entrained methanol from a stream of carbon monoxide and hydrogen.

We claim as our invention:

1. Process for the separation of liquid from a gas stream comprising: dividing a liquid carrying gas stream into a plurality of streams, bringing said streams into collision one with another, conducting the resulting stream through a conduit, impinging said stream against a plate-like member in a chamber, withdrawing a gas stream from the top of said chamber, impinging said stream against a plate-like member in a second chamber and removing the substantially liquid free gas from the top of said second chamber.

2. Apparatus for the separation of entrained liquid from a gas stream, comprising a gas collision chamber, diametrically opposed gas inlets thereto, a conduit leading downward from said chamber, a plate mounted crosswise to the discharge end of said conduit, a second chamber surrounding the discharge end of said conduit, a pipe connecting the top of said second chamber to a second conduit leading downward into a third chamber, and a plate mounted crosswise to the discharge end of said second conduit.

3. Apparatus for the separation of entrained liquid from a gas stream, comprising a gas collision chamber, diametrically opposed gas inlets thereto, a conduit leading downward from said chamber, a plate mounted crosswise to the discharge end of said conduit, a second chamber surrounding the discharge end of said conduit, a pipe connecting the top of said second chamber to a second conduit leading downward into a third chamber, and a conduit connecting the bottom of said second chamber to a point intermediate the top and bottom of said third chamber.

4. Process for removing liquid anhydrous ammonia from a stream of nitrogen and hydrogen gases under high pressure, comprising dividing the ammonia-carrying stream into a plurality of streams, bringing said streams into collision one with another, conducting the resultant stream through a conduit, impinging said stream against a plate-like member in a chamber, withdrawing a gas stream from the top of said chamber, impinging said stream against a plate-like member in a second chamber, and removing the substantially ammonia-free nitrogen-hydrogen gas from the top of said second chamber.

5. Process for removing liquid anhydrous ammonia from a stream of nitrogen and hydrogen gases under high pressure, comprising dividing the ammonia-carrying stream into a plurality of streams, bringing said streams into collision one with another, conducting the resultant stream through a conduit, impinging said stream against a plate-like member in a chamber, withdrawing a gas stream from the top of said chamber, impinging said gas stream against a plate-like member in a second chamber, withdrawing a liquid ammonia stream from the bottom of said first-mentioned chamber, discharging said liquid stream into said second chamber, and removing substantially liquid-free nitrogen-hydrogen gas from the top of said second chamber.

EWALD PYZEL.
RICHARD TILLMANN.